United States Patent [19]
Sullivan

[11] Patent Number: 5,647,268
[45] Date of Patent: Jul. 15, 1997

[54] INFUSION SLEEVE FOR WINE BARRELS

[76] Inventor: Stephen T. Sullivan, P.O. Box 1693, Sausalito, Calif. 94966

[21] Appl. No.: 626,534

[22] Filed: Apr. 2, 1996

[51] Int. Cl.$^6$ ..................................................... C12G 3/07
[52] U.S. Cl. ............................................. 99/277.1; 99/276
[58] Field of Search ............................. 99/277.1, 277.2, 99/275, 276, 277, 278

[56] References Cited

U.S. PATENT DOCUMENTS

| | | | |
|---|---|---|---|
| 2,108,661 | 2/1938 | Farrier | 99/277.1 |
| 2,114,009 | 4/1938 | Ramsay | 99/277.1 |
| 2,195,662 | 4/1940 | Vansant | 99/277.1 |
| 2,203,229 | 6/1940 | Nilsson | 99/277.1 |

*Primary Examiner*—Reginald Alexander
*Attorney, Agent, or Firm*—Larry D. Johnson

[57] ABSTRACT

An infusion apparatus for use with standard wine barrels to impart oak characteristics to a wine includes a permeable sleeve member consisting of one or more sleeve sections, each sleeve section containing a plurality of small oak staves, and terminating in a fastener for attachment to the wine barrel bung. The sleeve member sections are inserted through the bung hole of the wine barrel, and fastened to the bung for attachment. This enables the winemaker to achieve an oak extraction level of a new barrel with one load of the infusion sleeve over a reasonable period of time.

3 Claims, 2 Drawing Sheets

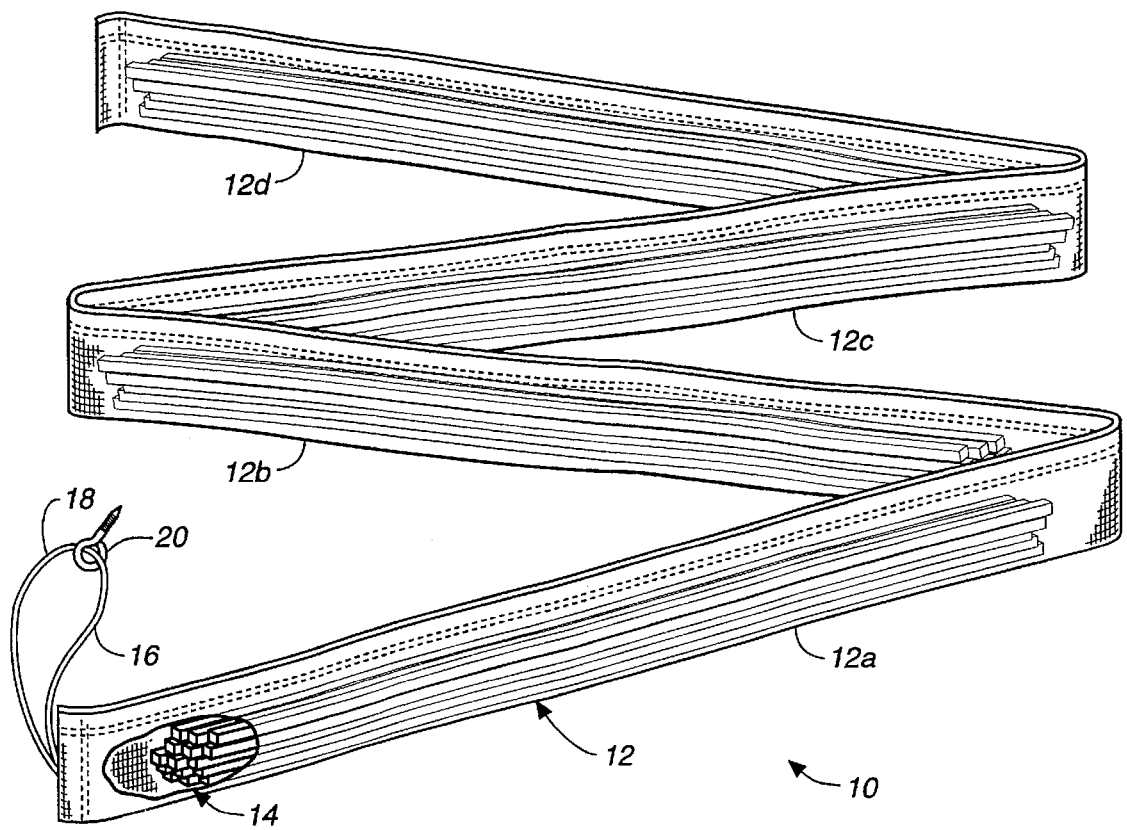
FIG._1

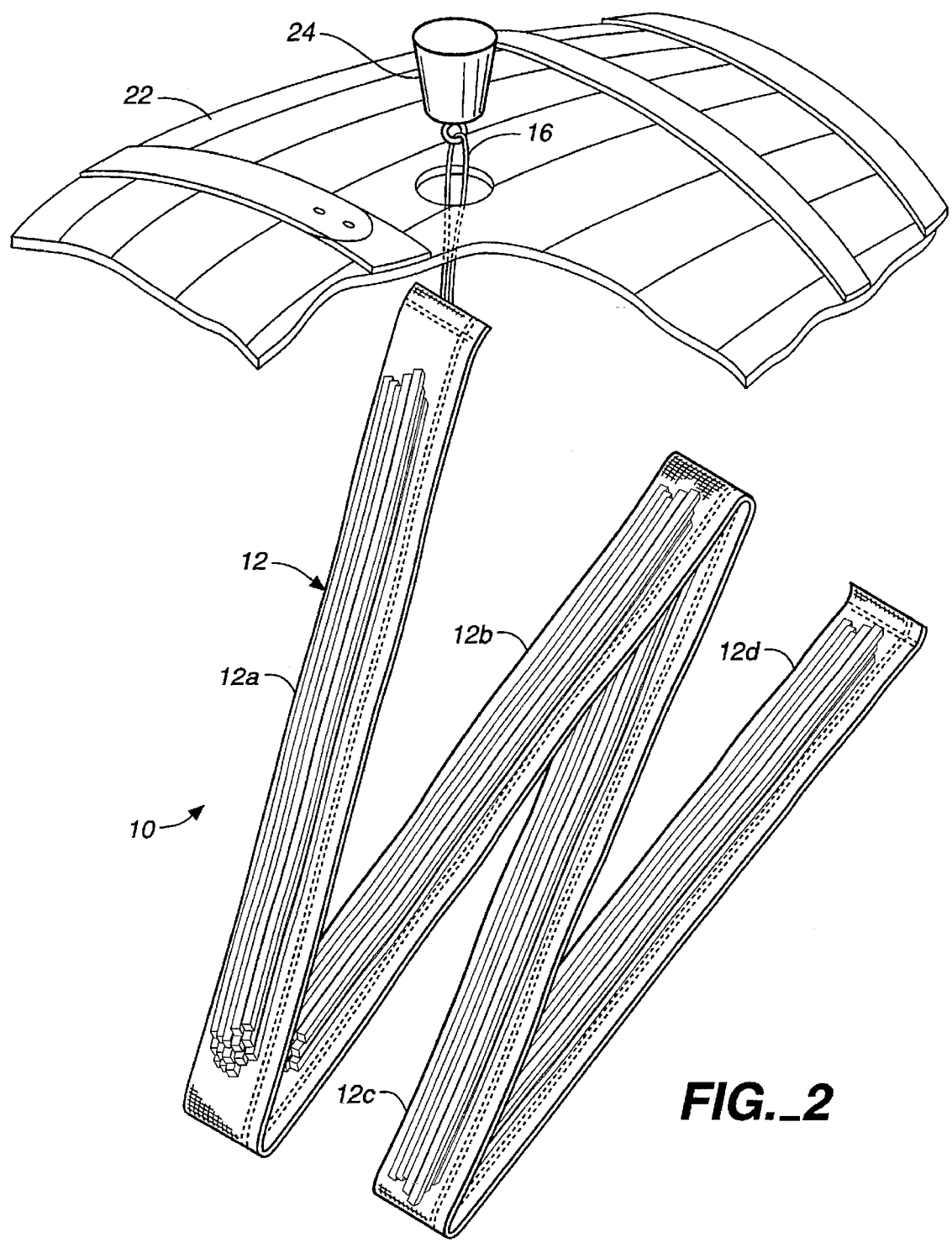
FIG._2

INFUSION SLEEVE FOR WINE BARRELS

BACKGROUND OF THE INVENTION

1. Field of the Invention

This invention relates generally to winemaking processes and equipment, and more specifically to an improved infusion sleeve apparatus for use with standard wine barrels to impart oak characteristics to a wine.

2. Description of the Prior Art

Wine barrels are well known, and are typically constructed of oak or similar wood material, which assists in the aging of the wine and imparts a desirable flavoring characteristic to the wine. Unfortunately, wooden barrels are expensive and difficult to maintain, and may only be used for a limited period of time before they must be replaced.

The use of stainless steel barrels solves many of these problems, but by their very nature these metal barrels do not yield the desirable wood characteristics to the wine. Some devices have been developed in an effort to address this problem. For example, Sullivan U.S. Pat. No. 5,174,461 discloses an apparatus that enables placement of wood slats inside a stainless steel or other wine barrel to impart the desired oak characteristics to the wine. However, such devices typically require removal of the barrel head, insertion of stainless steel brackets and new staves, and subsequent replacement of the head. This process can be unsanitary, time consuming and high in labor costs.

Sullivan U.S. Pat. No. 5,481,960 provides an apparatus for use with standard wine barrels to impart oak characteristics to a wine. A quantity of small oak cubes or chips are placed inside a section of perforated tube and the ends of the tube are sealed. The perforated tube is then inserted through the bung hole of the wine barrel, and the bung hole sealed with a bung member. This enables the winemaker to periodically replace the wood cubes or chips by simply removing the infusion tube through the bung hole, replacing the wood cubes or chips, and re-inserting the infusion tube back into the wine barrel. However, this structure is limited in its oak capacity, requiring periodic replacement of the oak with fresh oak, and otherwise may not be suitable for some applications.

SUMMARY OF THE INVENTION

The infusion sleeve for wine barrels of this invention provides an improved apparatus for use with standard wine barrels to impart oak characteristics to a wine. The inventive sleeve apparatus includes a permeable envelope or sleeve member consisting of one or more sleeve sections, each sleeve section containing a plurality of small oak staves or similar flavor-imparting material, the sleeve member terminating in a fastener such as a fabric loop and eyescrew for attachment to the wine barrel bung. The sleeve member sections are inserted through the bung hole of the wine barrel, using the loop to secure the sleeve member to the eyescrew which may be screwed into the bung member (e.g., the loop may be threaded through the eyescrew and looped over the bung for attachment), and the bung member is then inserted into and seals the bung hole in the traditional manner. This removably inserts the sleeve sections into the barrel so that oak flavors may be infused into the wine.

The inventive infusion sleeve is designed to fit into traditional Burgundy, Bordeaux or Puncheon size export-style wine barrels through the bung hole of the barrel. The infusion sleeve is of a size to fit through the bung hole and thus preferably of a diameter or width somewhat less than the diameter of the wine barrel bung hole (e.g. $1^{11}/_{16}$ inches diameter). The infusion sleeve permeable envelope is preferably made of flexible food grade material (e.g. nylon netting, 800 micron food grade syrex, cloth, plastic or similar material), that will not impart any adverse flavors into the wine. The eyescrew is preferably made of 304 stainless steel or similar metal, or some other inert material.

Advantages to the inventive infusion sleeve apparatus include:

1. The apparatus may be used to ferment and/or age liquids in older, neutral barrels. Loaded with toasted oak, the apparatus will provide a full 100–150% extraction level of a new oak barrel in approximately four months.

2. The apparatus prolongs the use of older cooperage. The infusion sleeve creates an efficient and sanitary alternative for producers who don't want to pull the heads off existing barrels to insert new oak staves to rejuvenate the barrels.

3. The infusion sleeve is ideal for those who wish to only load oak once into the barrel, but still offers ease in controlling the oak extraction level.

4. The infusion sleeve contains the oak which provides protection for equipment and reduces labor cost in cleaning the barrel.

5. Desired toast levels may be chosen for the oak mini-staves.

BRIEF DESCRIPTION OF THE DRAWINGS

FIG. 1 is a partially cutaway perspective view of an infusion sleeve for wine barrels of this invention, illustrating the component parts including a permeable envelope or sleeve member consisting of a plurality of sleeve sections, each sleeve section containing a plurality of small oak staves or similar flavor-imparting material, the sleeve member terminating in a fastener such as a fabric loop and eyescrew for attachment to a wine barrel bung; and FIG. 2 is cutaway perspective view of the infusion sleeve of this invention installed into a typical wine barrel so that the sleeve member fastener is attached to the wine barrel bung member, and the sleeve member is submerged into the wine in the barrel.

DETAILED DESCRIPTION OF A PREFERRED EMBODIMENT

FIG. 1 is a partially cutaway perspective view of an infusion sleeve 10 for wine barrels of this invention, illustrating the component parts including a permeable envelope or sleeve member 12 consisting of a plurality of connected, articulating sleeve sections 12a, 12b, 12c, 12d, each section approximately eighteen inches in length. Each sleeve section contains a plurality (e.g., ten) of small oak staves 14 or similar flavor-imparting material. For example, French oak (Quercus Robur) and/or American Oak (Quercus Alba), in four or six section inserts, can be placed in the barrel once during the initial winemaking process. Within four to six months, depending on the winemaker's style, the four section sleeve will impart the same balanced level and quality of a traditionally coopered barrel, and the six section sleeve imparts a concentrated level of oak extract.

The sleeve member terminates in a fastener 16 such as a fabric loop 18 and eyescrew 20 for attachment to a wine barrel bung. Alternatively, any of a variety of well-known fasteners could be used, including simple line, adhesive, clamps or the like.

FIG. 2 is cutaway perspective view of the infusion sleeve 10 of this invention installed into a typical wine barrel 22 so that the sleeve member fastener 16 is attached to the wine barrel bung member 24, and the sleeve member 12 is submerged into the wine in the barrel. The articulating nature of the respective sections 12a, 12b, 12c and 12d permits the overall length of the sleeve member to be great enough to contain an adequate quantity of oak, yet still be narrow enough to fit into the bung hole, and articulate to fit within the inside diameter of a typical barrel.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An infusion sleeve for wine barrels having a bung hole and a barrel bung, said infusion sleeve comprising:

a permeable sleeve member comprising a plurality of connected, articulating sleeve sections, each sleeve section containing a plurality of oak staves, said sleeve member terminating in a fastener for attachment to the wine barrel bung.

2. The infusion sleeve of claim 1 wherein said fastener comprises a fabric loop connected to said sleeve member.

3. The infusion sleeve of claim 1 wherein said sleeve member comprises an envelope of flexible material.

* * * * *